United States Patent
Mahieux et al.

(10) Patent No.: US 6,957,917 B2
(45) Date of Patent: Oct. 25, 2005

(54) HYDRODYNAMIC AXIAL SLIDE BEARING FOR A GENERATOR

(75) Inventors: Celine Mahieux, Birmenstorf (CH); Axel Guenter Albert Fuerst, Gebenstorf (CH)

(73) Assignee: Alstom Technology Ltd., Baden (CH)

(*) Notice: Subject to any disclaimer, the term of this patent is extended or adjusted under 35 U.S.C. 154(b) by 8 days.

(21) Appl. No.: 10/470,143

(22) PCT Filed: Jan. 24, 2002

(86) PCT No.: PCT/IB02/00203

§ 371 (c)(1),
(2), (4) Date: Oct. 14, 2003

(87) PCT Pub. No.: WO02/059490

PCT Pub. Date: Aug. 1, 2002

(65) Prior Publication Data

US 2004/0066993 A1 Apr. 8, 2004

(30) Foreign Application Priority Data

Jan. 24, 2001 (EP) .................................. 01810063

(51) Int. Cl.$^7$ .............................................. F16C 17/06
(52) U.S. Cl. ..................................................... 384/121
(58) Field of Search ................................. 384/121, 122, 384/123, 124, 112, 107

(56) References Cited

U.S. PATENT DOCUMENTS

| 3,873,168 A | 3/1975 | Viola et al. |
| 4,603,071 A | 7/1986 | Wehnert et al. |
| 5,234,752 A | 8/1993 | Laflin et al. |
| 5,796,349 A | 8/1998 | Klein |
| 5,821,204 A | 10/1998 | Kato et al. |
| 6,176,619 B1 * | 1/2001 | Nagasaka et al. ........... 384/123 |

FOREIGN PATENT DOCUMENTS

| DE | 32 08 718 A1 | 10/1982 |
| DE | 197 19 858 A1 | 12/1997 |
| EP | 1 058 368 | 12/2000 |
| GB | 2 095 170 | 9/1982 |
| JP | 10089346 | 9/1996 |
| JP | 11270550 | 10/1999 |

* cited by examiner

Primary Examiner—Lenard A. Footland
(74) Attorney, Agent, or Firm—Cermak & Kenealy, LLP; Adam J. Cermak

(57) ABSTRACT

Hydrodynamic plane thrust bearing (26) for a generator (10), preferably operable with a water turbine, with a rotor (12), a track ring (30) rotating with the shaft (20) of the rotor (12), and a bearing segment (32) not rotating with the shaft (20) of the rotor (12) and supported on a bearing housing (24), characterized in that the track ring (30) substantially consists of a plastic matrix with reinforcing fibers embedded therein.

6 Claims, 2 Drawing Sheets

HYDRODYNAMIC AXIAL SLIDE BEARING FOR A GENERATOR

FIELD OF THE INVENTION

The invention relates to a hydrodynamic plane thrust bearing for a generator for current production, according to the preamble of claim 1.

DESCRIPTION OF PRIOR ART

The bearings occupy a key position in large generators for current production. If the bearing fails, the current production based on this generator comes to a standstill. Besides the radial bearings for the shaft, the thrust bearings, above all in vertically operated generators, such as are, for example, used for current production by means of water turbines, have to withstand a large load. A very elegant but expensive possibility is the design of the axial bearing as a magnetic bearing. Another possibility consists of its design as a roller bearing. However, these bearings are not suitable for diameters of several meters, because of their large dimensions and the associated relatively large shape inaccuracy of the individual parts.

Hydrodynamic plane thrust bearings are the usual constructional form, in which a track ring is fixed to and rotates with the rotor shaft. This track ring supports the rotor axially against a bearing housing. The track ring slides on a lubricant film over bearing segments arranged in the bearing housing.

According to EP 1058368A2, FIG. 3, hydrodynamic thrust bearings are used for shaft mounting, and are constructed as axial journal bearings or as combined journal and double thrust bearings. The bearing method is ensured by means of a stable hydrodynamic lubricant film, which is built up by a wedge profile in the lubrication gap. In such large generators for current production, track rings of about 2 m–6 m diameter are used. At the high rotational speeds used, correspondingly high temperatures occur in the hydrodynamic plane thrust bearings and have to be withstood by the track ring. Furthermore, the hydrodynamic pressure in the lubrication gap can become so large that even adjoining metallic surfaces are permanently deformed. The track rings for such hydrodynamic plane thrust bearings must therefore have a high stiffness and strength and also a high heat resistance. Hence they were heretofore made of steel. So that an immediate breakdown of the bearing does not occur upon partial lubrication failure of the hydrodynamic plane thrust bearing, the bearing segments are coated with a sliding material such as, for example, white metal or polytetrafluoroethylene (PTFE). Because of the large thermal expansion coefficient of steel, however, deformation of the track ring (curvature of the surface or wave formation) occurs under the high temperatures in the bearing, and represents a greater problem, the greater the diameter of the track ring. Due to the unpredictable deformations, large wear phenomena or even damage can occur in these track rings in the hydrodynamic plane thrust bearing. The maintenance cost and inoperative time for changing single bearing components are correspondingly large, and reduce the economic efficiency of the generator. Moreover, the weight of the steel track rings in large generators, such as are used for current production, often already represent a problem in transport and during mounting at the site.

SUMMARY OF THE INVENTION

The object of the invention is therefore to provide a hydrodynamic plane thrust bearing of the kind mentioned at the beginning, having a higher lifetime and loadability and simpler mounting, so that the generator is more economical in mounting and operation.

This object is attained by a hydrodynamic plane thrust bearing according to the preamble of claim 1, in which the track ring substantially consists of a plastic matrix with reinforcing fibers embedded therein. Such a plane thrust bearing therefore possesses a high lifetime, because the fiber-reinforced plastic has a smaller expansion coefficient than steel and the track ring therefore deforms hardly at all. Thus damage due to large deformations of the steel track rings are avoided. Since in addition track rings of fiber-reinforced plastic furthermore have a much smaller weight than those of steel, both transport and mounting are much more easily and cost-effectively performed. Furthermore larger designs of such bearings can be implemented than is possible with steel track rings.

It is very favorable to use a fiber-reinforced plastic with continuous fibers, since in this manner both more favorable stiffness values and also a smaller expansion coefficient are attained.

If the track ring is manufactured as a laminate of at least four layers of fiber-reinforced plastic with respectively unidirectionally aligned fibers, and if the angle of the fiber direction of the layers is between 0° and 90°, the thermal expansion of the track ring can be further reduced.

If an epoxy matrix is chosen as the plastic matrix, an advantageous heat resistance is ensured.

It is very advantageous if carbon fibers are used as the reinforcing fibers, since these have a negative thermal expansion coefficient. If carbon fibers are embedded, laminated into an epoxy resin matrix, a material of almost no thermal expansion and with an increased specific stiffness can be attained.

According to the requirements of the respective hydrodynamic plane thrust bearing, a fiber proportion of 50 vol. % to 70 vol. % in the track ring is very advantageous, since the strength and stiffness of the track ring rise with increasing fiber proportion.

BRIEF DESCRIPTION OF THE DRAWINGS

The subject of the invention is explained in detail hereinafter using examples of preferred embodiments which are shown in the accompanying drawings. Purely schematically.

Figure 1:
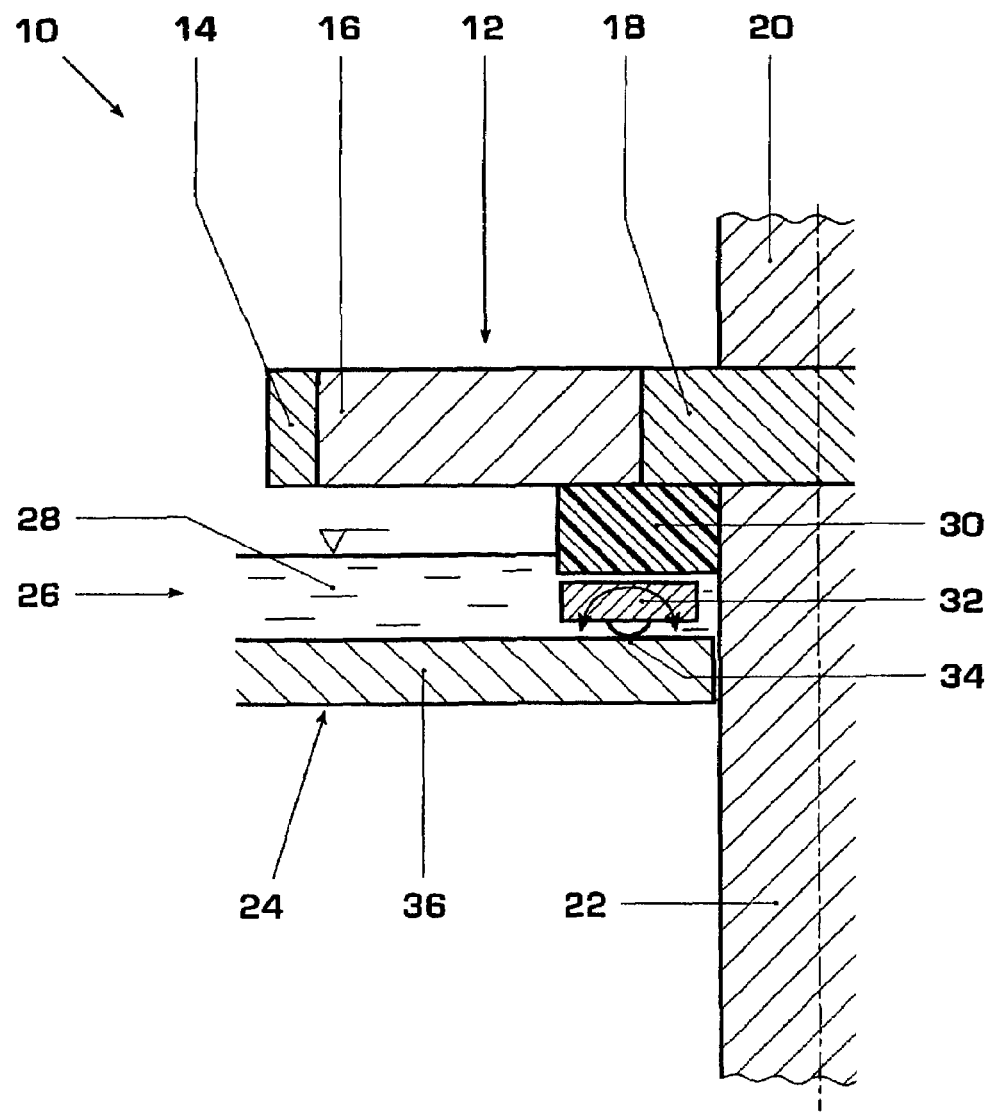
FIG. 1 shows a sectional diagram of a hydrodynamic plane thrust bearing with a composite material track ring according to the invention.

The reference numerals used in the drawings and their meaning are summarized in the list of reference numerals. Basically the same parts are given the same reference numerals in the Figures. The described embodiment examples are given as examples of the subject of the invention and are in no way limitative thereof.

DESCRIPTION OF PREFERRED EMBODIMENTS

FIG. 1 shows schematically an excerpt of a vertically aligned generator 10 driven by a water turbine (not shown). A rotor 12 of the generator 10 is shown, with generator poles 14 at the edge of the rotor crown 16. The rotor crown 16 is connected to the rotor shaft by means of a rotor hub 18. The rotor shaft can be embodied as one piece or, as shown, by an upper shaft portion 20 and a lower shaft portion 22. The rotor hub 18 likewise connects the upper shaft portion 20 of the generator 10 with the lower shaft portion 22, which leads to the turbine (not shown). The lower shaft portion 22 of the turbine is axially mounted in a bearing housing 24. A hydrodynamic plane thrust bearing 26 is arranged between the bearing housing 24 and the rotor 12. The hydrodynamic plane thrust bearing 26 consists of a rotating track ring 30 of a fiber-reinforced plastic matrix and of stationary bearing segments 32. The bearing segments 32 are embodied so that a wedge-shaped lubricating film can form between the track ring 30 and the bearing segments 32. These bearing segments 32 are as a rule individual members which can freely turn around a fulcrum 34 supported on the housing wall 36 of the bearing housing 24, as indicated by a corresponding double arrow in FIG. 1. The lubrication gap can be optimally set up in this manner. The hydrodynamic plane thrust bearing 26 is operated using a lubricant 28, usually machine oil. The oil level exceeds the height of the lubrication gap between the track ring 30 and the bearing segment 32. An individual oil supply to the individual bearing segments 32 is also conceivable.

Figure 2:
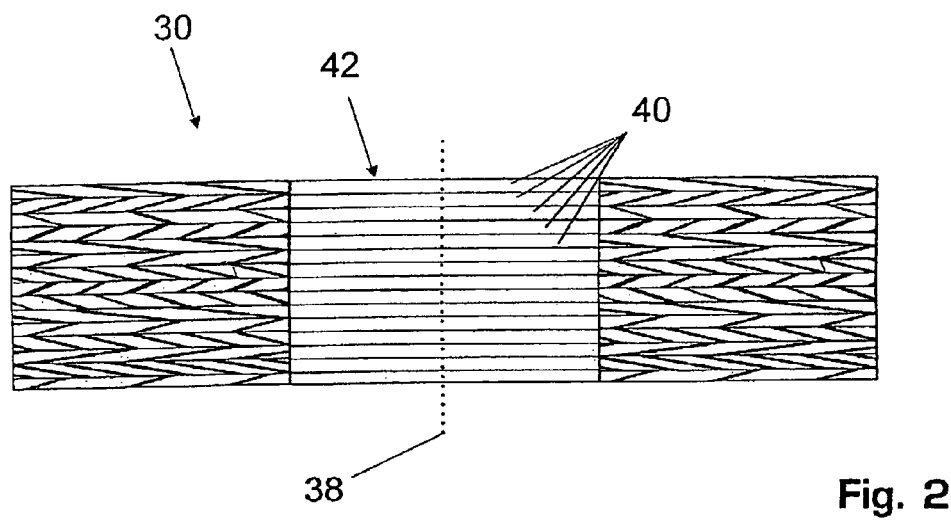
FIG. 2 shows a section through a track ring according to the invention.

FIG. 2 shows a preferred embodiment of the track ring 30 of fiber-reinforced plastic, in section along the rotation axis 38. The track ring 30 is produced as a laminate of plural layers 40 of fiber-reinforced plastic, the fibers being carbon fibers with unidirectional alignment in each layer 40. The fibers are embedded in an epoxy matrix. The angle of the alignment of the carbon fibers is changed from layer 40 to layer 40. In order to obtain the required thickness of the track ring 30, an angle sequence of $[[0°/-45°/45°/90°]_{symmetrical}]_n$ repeated with a plurality of times (index "n").

Figure 3:
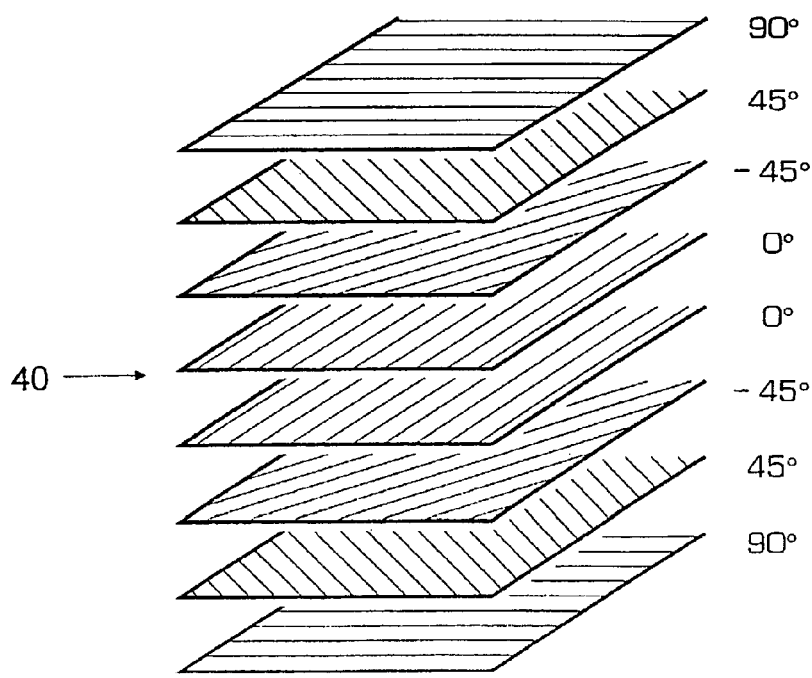
FIG. 3 shows an exemplary exploded diagram of eight successive layers of the track ring.

The sequence of eight layers 40 with the given angle sequence is shown in FIG. 3 in an exploded diagram. A deformation of the track ring can be countered by such a symmetrical layer arrangement. The alignment angle of the fibers can of course vary.

The track ring can be produced simply and favorably, e.g., by an autoclave method from preformed prepregs. An aperture 42 in the middle of the track ring, required for the shaft 20/22 to pass through the track ring 30, can easily be produced by drilling or turning. Required structures in the surface of the track ring 30 can of course likewise easily be machined into the surface by milling.

According to the requirements of the hydrodynamic plane thrust bearing, fibers such as carbon fibers, glass fibers or also polyamide fibers can be used. Instead of an epoxy matrix, other thermally resistant plastics can also be chosen, such as, for example, Rhodeftal polyaminoimide (from Vantico). Where this appears necessary, a further coating can be applied to the track ring, and is likewise to be preferably a plastic coating because of better adhesion properties.

It is of course possible to manufacture not only the track ring but also the shaft of the fiber-reinforced plastic. Further weight can be saved thereby.

A further advantage of the whole construction of the generator results when the hydrodynamic plane thrust bearing is combined with a radial guide bearing. The track ring is then used both for the plane thrust bearing and for the guide bearing. In this case, the smaller deformation of the track ring improves the operating behavior of the radial bearing.

REFERENCE LIST 10 generator
12 rotor
14 generator pole
16 rotor crown
18 rotor hub
20 upper shaft portion
22 lower shaft portion
24 bearing housing
26 hydrodynamic plane thrust bearing
28 lubricant
30 track ring
32 bearing segment
34 fulcrum
36 housing wall
38 rotation axis
40 layer
42 aperture

What is claimed is:

1. A hydrodynamic plane thrust bearing for a generator operable by means of a water turbine, comprising:
    a rotor having a shaft;
    a track ring rotating with the shaft of the rotor;
    a bearing housing; and
    at least one bearing segment not rotating with the shaft of the rotor and supported on the bearing housing;
    wherein the track ring comprises a plastic matrix with reinforcing fibers embedded in the matrix, and comprises a laminate of at least four layers of fiber-reinforced plastic, the fibers in each layer being unidirectionally aligned and the angle of the fiber alignment of the layers being between 0° and 90°.

2. A hydrodynamic plane thrust beating according to claim 1, comprising continuous fibers embedded in the plastic matrix.

3. A hydrodynamic plane thrust bearing according to claim 2, wherein the plastic matrix comprises an epoxy matrix.

4. A hydrodynamic plane thrust bearing according to claim 1, wherein the reinforcing fibers comprise carbon fibers.

5. A hydrodynamic plane thrust bearing according to claim 1, wherein the fiber proportion in the matrix is between 50 vol. % and 70 Vol. %.

6. A hydrodynamic plane thrust bearing according to claim 1, wherein the layers of the laminate have an angle sequence of $[[0°/-45°/45°/90°]_{symmetrical}]_n$.

* * * * *